United States Patent Office 3,432,370
Patented Mar. 11, 1969

3,432,370
FLARE COMPOSITION CONTAINING ALKALI METAL NITRATE, MAGNESIUM, AND A COPOLYMER REACTION PRODUCT BINDER
Charles W. Bash and George A. Lane, Midland, Mich., assignors to The Dow Chemical Company, Midland, Mich., a corporation of Delaware
No Drawing. Filed Aug. 24, 1967, Ser. No. 662,887
U.S. Cl. 149—19     5 Claims
Int. Cl. C06d 1/10

ABSTRACT OF THE DISCLOSURE

An illuminating flare composition comprising an alkali metal nitrate as oxidizer, particulate light metal as fuel and crosslinked copolymer of an epoxy resin and a nitrate- or perchlorate salt of an amine terminated polyglycol as binder.

BACKGROUND OF THE INVENTION

Flare compositions currently employed for bright light dissemination, e.g. on battlefields, are based on a mixture of magnesium powder, sodium nitrate oxidizer and a Laminac polyester resin binder. Flare grains are prepared from this composition by pressing at a high pressure, e.g. about 4,000 pounds per square inch, and curing. Small flares readily can be fabricated from this composition by such high pressure packing technique. However, there is an ever increasing need and requirement for munitions and flares of large sizes. As the size of the flare increases, the economics of pressing becomes more and more unfavorable; therefore, the use and desirability of castable flare compositions is becoming of greater importance.

It is a principal object of the present invention to provide a novel flare composition which is both readily castable and compactable without requiring high forming pressures.

It is also an object of the present invention to provide a castable flare composition which is readily compactable into a condensed system and burns with a high efficiency and bright light.

These and other objects of the present invention readily will become apparent from the detailed description presented hereinafter.

SUMMARY

The castable flare composition of the present invention comprises an alkali metal nitrate oxidizer, a finely divided readily combustible particulate metal that emits large quantities of visible light energy upon combustion, e.g. magnesium and magnesium alloys, and a copolymer reaction product of an amine curable epoxy resin and a salt of an amine terminated polyglycol as binder.

In general the oxidizer and particulate metal fuel are employed in about a stoichiometric relationship as required for complete oxidation of the fuel by the inorganic oxidizer. The binder ranges from about 2 to about 18 percent of the total flare weight.

DESCRIPTION OF PREFERRED EMBODIMENTS

A preferred embodiment of the present invention comprises finely divided (e.g.~35 microns) sodium nitrate as oxidizer, finely divided flake or atomized (maximum of about 400 microns) magnesium (i.e. metallic magnesium or a magnesium base alloy) as fuel and a copolymer reaction product of an amine curable epoxy resin and the perchlorate- or nitrate salt of an amine terminated polyglycol as binder. In this preferred embodiment the weight ratio of sodium nitrate/magnesium employed is about 0.65 and the weight of the binder ranges from about 3 to about 15 percent of the total flare weight. The ratio of epoxy to amine terminated polyglycol salt components in the resin binder ranges from about 0.5 to about 2.5, based on the epoxide equivalent/amine hydrogen equivalent (AHE), of that required stoichiometrically for complete cross-linking, i.e. a ratio of 1.

The copolymer binder for use in the present flare composition is prepared by reacting a liquid or flexible epoxy or epoxy based resin (e.g. D.E.R. 332, D.E.R. 732, D.E.R. 736 and Epon 812 epoxy resins) with a perchlorate or nitrate salt of an amine terminated polyglycol wherein the polyglycol moiety is selected from straight and branched chain aliphatic polyglycols such as, for example, polyethylene, polypropylene and polybutylene, trifunctional polyglycols such as polyhydroxypropylglycerine, polytriols derived from ethylene oxide and propylene oxide, polymerized glycols such as hexylene glycol, 2-ethyl-1,3-hexanediol, 1,2,6-hexanetriol and the like. Preferably the perchlorate- or nitrate salts of diamine terminated polyethylene-, polypropylene-, or polybutylene glycols having a molecular weight of from about 200 to about 2000 or more wherein from about 35 to about 100 percent of the available amine groups have been reacted with the nitrate or perchlorate groups are employed.

The resulting cross-linked polymer products make excellent binders for flare compositions in that they have good strength and flexibility. Additionally, there is the added advantage that there is no apparent reaction and/or undesirable viscosity increase during formulation of the flare. Further, this binder need not be pressurized at a high pressure to compact the flare. The oxygen content, from the $NO_3^-$ or $ClO_4^-$ and the ether groups makes this binder partially self-oxidizing thereby lowering the oxygen demand of the overall system and results in higher oxidation efficiency of the metal fuel by the sodium nitrate.

The nitrate- or perchlorate salt of the amine terminated polyglycol can be prepared by direct reaction of a predetermined quantity of an acid based material, e.g. acid, acid anhydride or salt, with a diamine terminated polyglycol. Usually the reaction is carried out at a temperature of from about 10 to about 80° C. for a period of from about 30 minutes to about 6 hours or more at a subatmospheric pressure, e.g. at from about an absolute vacuum to about 150 milliliters mercury absolute.

In actual preparation of the flare, the binder components, oxidizer and metal can be mixed to provide a substantially uniform blend; the resulting mixture is either tapped, vibrated, extruded, pressed at relatively low forming pressures or cast, depending upon its consistency, into a shaped grain, and cured at a temperature of from room temperature to about 100° C. for a period of from about 5 to about 48 hours, preferably at about 70° C. for about 24 hours.

Conveniently, the binder components, fuel and oxidizer components are mixed, stirred or mulled until a substantially homogeneous mix is obtained. Alternatively, the oxidizer and fuel components can be introduced separately or as a mixture into a continuously agitated mass of the binder components and stirring can be continued after completion of the addition until the desired degree of homogeneity is achieved in the mix.

The actual method of flare grain formation used will depend to a large extent on the amount of binder employed in the composition. At the lower binder levels (up to about 10% by weight of the total flare) the mixed flare composition is a damp powder that flows under vibration. Such compositions readily are compacted by pouring with tapping into a mold. At from about 10 to As a control, flares were prepared using the same fuel and oxidizer in an identical fuel/oxidizer ratio but a Laminac polyester resin, as conventionally employed in such flares, was used as the binder. The control grains were formed by pressing a blended composition pressure of about 2000 p.s.i.

Table I which follows presents composition data, grain characteristics and burning rate results for a number of cured flares. In the table, the light output is expressed as a relative percentage based on the control with 6 percent Laminac polyester resin binder as 100%.

TABLE I

| Run No. | Polyglycol salt form | Flare weight (g.) | Binder weight (percent of total flare) | Method of grain fabrication | Cured flare density (g./cc.) | Burning rate (in./sec.) | Light output (percent) |
|---|---|---|---|---|---|---|---|
| 1 | $ClO_4^-$ | 100 | 6 | Pressing | 1.94 | 0.047 | 102 |
| 2 | $ClO_4^-$ | 40 | 7 | do | 1.63 | 0.061 | 79 |
| 3 | $ClO_4^-$ | 100 | 9 | Vibrated | 1.50 | 0.034 | 68 |
| 4 | $ClO_4^-$ | 40 | 10 | do | 1.65 | 0.085 | 52 |
| 5 | $ClO_4^-$ | 100 | 12 | Cast | 1.83 | 0.031 | 68 |
| 6 | $ClO_4^-$ | 40 | 13.5 | do | 1.56 | 0.040 | 50 |
| 7 | $NO_3^-$ | 40 | 10 | Vibrated | 1.62 | 0.073 | 52 |
| Control A | | 100 | 6 | Pressed | 1.70 | 0.079 | 100 |
| Control B | | 40 | 6 | do | 1.57 | 0.088 | 100 |
| Control C | | 40 | 7 | do | 1.58 | 0.076 | 78 | about 12 percent binder, the composition becomes sticky much like soft modelling clay. Above about 12 percent, the system is a pourable, readily castable slurry.

The following example will serve to further illustrate the present invention but is not meant to limit it thereto.

Example

Flare compositions of 150 grams or more were prepared in a sigma blade mixer. In the formulating, finely divided magnesium powder, maximum size of about 400 microns, was first put into the mixer, and, with the mixer running binder components calculated to give a predetermined binder weight in the final flare were added. Finely divided sodium nitrate (about 35 microns) was added remotely to the mixer in from about 5 to 10 increments over a period of from about 15 to about 45 minutes. (This method assured that a minimum of the oxidizer adhered to the mixer blades.) During the blending operation the mixer was cooled by means of a water jacket to maintain a predetermined, substantially constant temperature within the range of from 20–50° C.

After the mixing was complete, samples were weighed and at about 60–70° C. were pressed at a moderate pressure of about 50 pounds per square inch, vibrated or cast into a flare grain. The flare grains were fabricated by clamping a 1¼ inch diameter cylindrical flare case between two pieces of aluminum. The bottom of the flare case was made of a plug consisting of a cured mixture of 33% of a brominated base epoxy binder and 67 percent sand which served as a non-brittle, non-flammable base.

The so-fabricated flares were cured for 24 hours at 70° C.

A number of 100 and 40 gram flares were made following this general procedure. In each case the sodium nitrate/magnesium weight ratio was maintained at 0.65. The monoperchlorate salt or mononitrate salt of an amine terminated polypropylene glycol (mol. wt. of polypropylene glycol about 2000) and D.E.R. 732 epoxy resin as cross-linker were used in a 1.65 ratio, based on the salt/epoxy resin weights, to provide the corresponding cross-linked binder. The flares were prepared using various weight percent of the binder based on the total flare composition.

Although the light output was reduced as the binder concentration increased, in all cases satisfactory light was realized. It is apparent to one skilled in the art that the relative proportions of oxidizer and fuel can be adjusted so as to provide the optimum in stoichiometry as desired for ultimate light output in any particular formulation.

Various modifications can be made in the present invention without departing from the spirit or scope thereof for it is understood that we limit ourselves only as defined in the appended claims.

We claim:

1. An illuminating flare composition which comprises an oxidizer consisting of finely divided alkali metal nitrate, finely divided magnesium or a magnesium alloy as fuel and a copolymer reaction product of an amine curable epoxy resin and the nitrate or perchlorate salt of an amine terminated polyglycol as binder, said particulate metal fuel and said oxidizer being present in about stoichiometric quantities as required for complete oxidation of the fuel by said oxidizer and said binder ranging from about 2 to about 18% of the total flare weight.

2. The composition as defined in claim 1 wherein the oxidizer is sodium nitrate, the fuel is magnesium and the binder is a copolymer reaction product of an amine curable liquid or flexible epoxy resin and a member selected from the group consisting of perchlorate- and nitrate salts of an amine terminated polyglycol, said binder ranging from about 3 to about 15 weight percent of the total flare weight.

3. The flare composition as defined in claim 2 wherein the binder is a cross-linked copolymer reaction product of a liquid amine curable epoxy resin and a member selected from the group consisting of the perchlorate- or nitrate salts of a diamine terminated polyethylene-, polypropylene- or polybutylene glycol having a molecular weight of from about 200 to about 2000 wherein from about 35 to about 100 percent of the available amine groups have been reacted with the nitrate or prechlorate group.

4. The flare composition as defined in claim 3 wherein the binder is a cross-linked copolymer reaction product of a liquid amine curable epoxy resin and a perchlorate salt of a diamine terminated polypropylene glycol.

5. The flare composition as defined in claim 3 wherein the binder is a cross-linked copolymer reaction product of a liquid amine curable epoxy resin and a nitrate salt of a diamine terminated polypropylene glycol.

References Cited

UNITED STATES PATENTS

| | | | |
|---|---|---|---|
| 3,162,558 | 12/1964 | Bishop et al. | 149—44 X |
| 3,258,373 | 6/1966 | Douda | 149—44 X |
| 3,261,731 | 7/1966 | Lopatin et al. | 149—44 X |
| 3,309,249 | 3/1967 | Allen | 149—44 X |

CARL D. QUARFORTH, *Primary Examiner.*

U.S. Cl. X.R.

149—20, 43, 44, 61